Nov. 4, 1969   Y. P. JACOB   3,476,239
BLISTER PACKAGE AND PRODUCT THEREOF
Filed Sept. 6, 1967
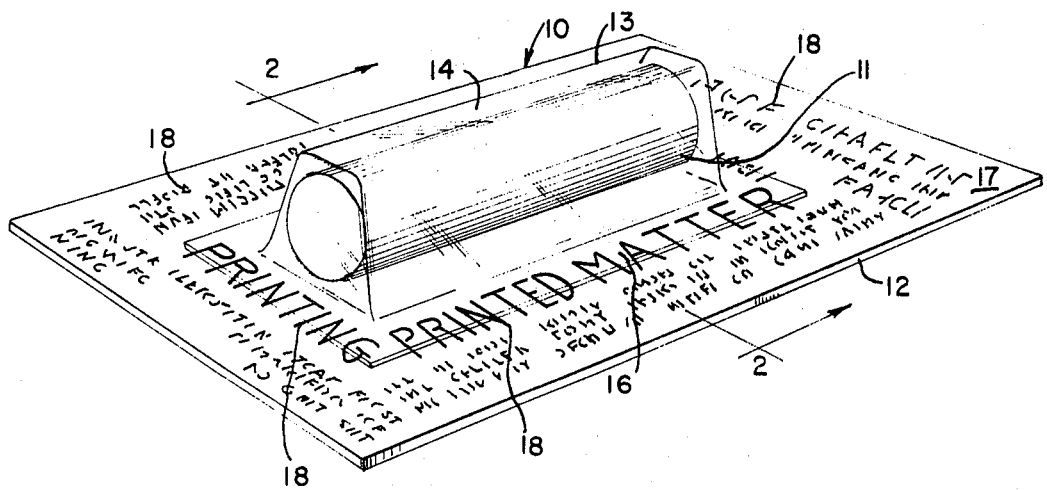
FIG-1-
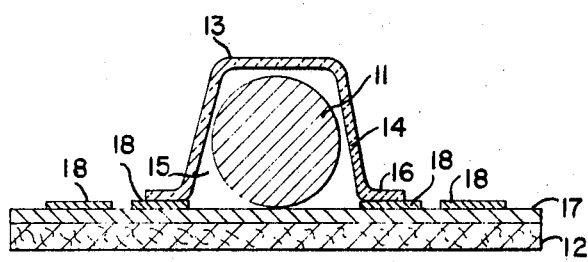
FIG-2-
INVENTOR
YUASH PETE JACOB
BY Paul Shapiro
ATT'Y.

United States Patent Office 3,476,239
Patented Nov. 4, 1969

3,476,239
BLISTER PACKAGE AND PRODUCT THEREOF
Yuash Pete Jacob, Palos Heights, Ill., assignor to Continental Can Company, Inc., New York, N.Y., a corporation of New York
Filed Sept. 6, 1967, Ser. No. 668,286
Int. Cl. B65d 75/36; B65b 5/00
U.S. Cl. 206—78          6 Claims

ABSTRACT OF THE DISCLOSURE

In a blister package of the type wherein an article is mounted on a paperboard display card and secured thereto by a molded, transparent, thermoplastic film known as a "blister," the blister is adhered to the paperboard card using an ink-receptive, heat-activatable adhesive coating. The paperboard is printed with a printing ink which does not deleteriously effect the bond between the coated paperboard and the blister film, the printing ink having a resinous vehicle comprised of a cyclic ketone-formaldehyde resin.

BACKGROUND OF INVENTION

*Field of invention.*—This invention relates to the packaging of articles and more particularly to a package of the "blister" type and a method of making such a package.

*The prior art.*—In the method of blister packaging, an article is mounted on a paperboard display card and secured thereto by a molded, transparent plastic covering known as a "blister." The blister is premolded by thermoforming techniques from relatively heavy thermoplastic film so as to conform generally to the shape of the article being packaged. The blister is formed with an outwardly-extending integral flange portion around the entire periphery of its mouth. Assembly of the package is ordinarily accomplished by loading the article within the cavity of the blister and thereafter attaching the flange portion of the blister to the display card, generally by heat-sealing to an adhesive-treated face of the card.

In recent years, blister packaging has gained wide popularity and acceptance in the packaging of various consumer goods. This type of package is particularly advantageous from a merchandising standpoint because it affords visual inspection of the article by the prospective purchaser, protection of the article against damage, and the inclusion of printed promotional copy and instructional information as a visual part of the composite package itself.

In a co-pending patent application, Ser. No. 547,476, entitled "Blister Package and Method of Making Same," filed May 4, 1966, and now abandoned, in the names of Paul W. Horeyseck, Clark R. Hayner, and Paul J. Holba, there is disclosed a method for coating the paperboard backing of the blister package with an ink-receptive, heat-activatable adhesive coating. The paperboard so coated can be printed with indicia and thereafter, without any intermediate treatment, be heat-sealed to a thermoplastic blister to provide a blister package. Although this method has proven very successful in the manufacture of blister packages, care must be taken to avoid printing where the thermoplastic blister will be heat-sealed to the board, as conventional printing inks deleteriously effect the adhesive bond between the blister film and the coated paperboard substrate resulting in package failure.

SUMMARY OF THE INVENTION

In accordance with the present invention, there is provided, in the manufacture of a blister package wherein a thermoplastic blister is sealed to a paperboard backing coated with an ink-receptive, heat-activatable coating, a method for printing the coated surface with a printing ink which does not deleteriously effect the adhesive bond between the thermoplastic blister and the coated paperboard surface, the printing ink composition comprising a resinous vehicle and a coloring compound, the resinous vehicle comprising a cyclic ketone-formaldehyde resin.

In the drawing:

FIG. 1 is a perspective view of an exemplary blister package formed in accordance with the present invention; and FIG. 2 is an enlarged vertical sectional view taken along line 2—2 of FIG. 1.

Referring to the drawings, there is illustrated therein a blister package 10 consisting of the article being packaged, shown as being a small cylindrical article 11, a paperboard backing 12 on which the article 11 rests, and a molded, transparent, thermoplastic blister 13 overlying and completely encasing the article 11. The blister 13 has a body portion 14 defining a cavity 15 for receiving the article 11, and an outwardly extending integral flange portion 16 around the entire periphery of the mouth of the cavity. The paperboard backing 12 is provided on its upper surface with an ink-receptive, heat-activatable adhesive coating 17 which has been printed with a cyclic ketone-formaldehyde vehicle containing printing ink 18 which overlies the coating 17. The printed matter may be, for example, promotional copy regarding the article being packaged or instruction for its use. The package may be assembled by loading the article 11 into the cavity 15 of the blister 13 and placing the printed paperboard backing in intimate contact with the flange portion 16 of the blister. Sufficient heat and pressure are then applied to the mating surfaces so as to activate the adhesive coating 17 and effect a heat-seal bond between the printed paperboard backing and the flange portion 16 of the blister.

PREFERRED EMBODIMENTS

The essential constituents of the heat-activatable adhesive printing ink 18 are a suitable coloring material, such as a pigment or dye suspended in a vehicle comprised of a cyclic ketone-formaldehyde polymer resin dissolved in a polyglycol or polyglycol ether solvent.

The cyclic ketone-formaldehyde resin which may be employed as the vehicle of the ink used in the process of the invention may be prepared, as is well known in the art, by reacting a cyclic ketone, such as cyclohexanone, substituted cyclohexanones such as methyl cyclohexanone, 2-camphanone, and the like, with formaldehyde in the presence of a mild alkaline catalyst, such as sodium borate or sodium carbonate, at a molar ratio ranging from 1:1 to 1:3 (cyclic ketone to formaldehyde) at the reflux of the cyclic ketone until a polymeric material of the desired molecular weight is attained.

In the practice of the present invention, cyclic ketone-formaldehyde polymer resins having molecular weights in the range of about 500 to about 700 have been found suitable in preparing the printing ink vehicle.

The printing ink may be made in the form of a solution of the cyclic ketone-formaldehyde in a suitable solvent, the amount of solvent being regulated to give the desired consistency particularly desirable solvent materials are polyglycols and polyglycol ethers. Illustrative examples of these glycol solvents include aliphatic glycols such as ethylene glycol, diethylene glycol, propylene glycol, tetramethylene glycol, and glycol ethers such as ethylene glycol monoethyl ether, ethylene glycol monobutyl ether, diethylene glycol monoethyl ether, and diethylene glycol monobutyl ether.

For the printing of paperboard of the type used in blister packaging, a high consistency is demanded in order that the ink may remain sufficiently fluid to adhere to the roller or pad, on the one hand, and be readily transferred to the platen or other surface to the paperboard being printed. Usually for such purposes, the cyclic ketone-formaldehyde resin is dissolved in a suitable polyglycol solvent at a concentration of 1.0 to 1.5 parts of solvent per part of resin. Solution may be affected by introducing the above materials in a kettle and heating the mixture to about 300° F. until a homogenous, clear, syrup-like fluid results.

The cyclic ketone-formaldehyde resin solution is mixed with a suitable pigment, dye, or other coloring matter, according to the color desired or acceptable. Commercial inorganic pigments which are thermally stable can be employed. Usable organic pigments include the heat-resistant lakes. The pigment may be present in an amount ranging from 10 to 40 parts by weight per 100 parts vehicle. Examples of suitable dyes and pigments which may be used include chrome yellow, phthalocyanine blue, phthalocyanine green, benzadine yellow, carbon black, titanium dioxide and the like. Other additives, such as nitrocellulose, plasticizers, fillers, waxes and the like, may then be added and the mixing continued until all the ingredients are wetted. The mass is then passed over an ink mill until a smooth homogenous ink results. This completes the steps in the preparation of the ink.

Optionally, a plasticizer may be incorporated in the ink in amounts ranging up to about 9 parts by weight per total ink composition. Suitable plasticizers include "Santicizer 8" (N-ethyl - o - and p-toluene-sulfonamide), "Santicizer 9" (o-and - p - toluenesulfonamide), "Santicizer 141" (2 - ethyl - hexyl-diphenyl-phosphate), "Santicizer 160" (butyl - benzyl - phthalate), butyl stearate, acetyl tributyl citrate, glycerol monostearate, and others.

A small amount of nitrocellulose, generally about 0.1 to about 0.3 part by weight per part of the resin solids in the ink, may also optionally be incorporated in the ink vehicle as it improves the thermoplasticity of the inks. The nitrocellulose is preferably of the ½ second ester-soluble type, known in the trade as the "RS" type, although other grades and viscosities, such as the "SS" type, may also be employed.

A small amount of a wax may be incorporated in the ink composition up to about 7 parts by weight of the total ink composition. The wax, preferably a polyethylene wax, is generally added to the printing ink to improve the scratch resistance of the ink.

A suitable ink-receptive heat-activatable adhesive coating 17 used to coat the paperboard may be of the type disclosed in aforementioned patent application Ser. No. 547,476, i.e., a finely divided coating pigment containing kaolin clay in at least a predominant amount, and a vinyl acetate polymer resin. The amount of vinyl acetate polymer resin in the coating may vary, on a solids basis, from 15 to 60 parts by weight, and preferably from 25 to 40 parts by weight per 100 parts by weight of the coating pigment.

The coating pigment may consist entirely of kaolin clay or it may be a mixture of kaolin clay and another pigment, with the kaolin clay comprising more than half of the total weight of the mixture. Other pigments which may be used in admixture with the kaolin clay include titanium dioxide, talc, calcium carbonate, diatomaceous silica, zinc oxide, zinc sulfide, aluminum powder, bronze powder, bartyes, blanc fixe, lithopone, aluminum hydroxide, calcium sulfate and satin white. The average particle size of the coating pigment is in the range of from 0.3 to 1.0 micron.

The vinyl acetate polymer resin may be polyvinyl acetate or a copolymer of vinyl acetate with a minor amount of another ethylenically unsaturated copolymerizable monomer, such as an alkyl acrylate or methacrylate, e.g., methyl acrylate, ethyl acrylate, butyl acrylate, methyl methacrylate, ethyl methacrylate, butyl methacrylate, etc.; a dialkyl maleate or fumarate, e.g., dimethyl maleate, diethyl maleate, dibutyl maleate, dimethyl fumarate, diethyl fumarate, or dibutyl fumarate; acrylic, methacrylic or crotonic acid; maleic anhydride; ethylene and similar compounds. Aqueous emulsions and aqueous solutions of these resins have been found to be particularly suitable.

The coating composition may also include various optional ingredients such as a plasticizer for the vinyl acetate polymer resin, a dispersing agent for the coating pigment, a defoamer, a coating lubricant and various dyes for imparting to the coating a particularly desired shade.

A liquid medium, preferably water, is generally added to the coating composition to adjust its viscosity to a desired level suitable for the coating operation.

The liquid coating composition may be prepared by forming a homogenous aqueous dispersion of the coating pigment having a solids content from about 40% to about 75% by weight. An emulsion or solution of the vinyl acetate polymer resin, preferably containing a plasticizer, is separately formed and then mixed with the pigment dispersion until a uniform mixture is obtained. If necessary, water or other suitable liquid medium may then be added to the liquid coating composition so as to adjust its final viscosity to the desired level for the particular coating procedure employed.

The liquid coating composition may be applied to the surface of the paperboard backing by any conventional paperboard coating procedure, such as air-knife, kiss-roll, brush, size-press, doctor-blade, etc. The coating should be applied in such a manner as to produce a continuous film having a dry weight of from one to eight pounds, preferably from three to six pounds, per 1,000 square feet of paperboard surface. Drying of the coated paperboard is generally carried out at temperatures ranging from 212° F. to about 300° F. by hot air or in any other suitable manner.

The paperboard backing 12 utilized for the present invention generally has a thickness within the range of from about 0.010 to about 0.040 inch, although thicker or thinner board may be used if desired. Various types of paperboard backing may be employed. A suitable paperboard backing, for example, is the type known in the trade as "patent coated" which has a face or top layer composed essentially of virgin pulp and high-grade waste, free of ground wood, and presenting an attractive finish and appearance.

The coated paperboard surface is ink-receptive and suitable for printing, and may be printed with the printing ink of the present invention by any of the conventional printing processes, such as typographic, multi-color offset, etc.

The printed paperboard is then dried at ambient temperatures ranging from about 70° to about 100° F.

The blister 13 is premolded by conventional thermoforming techniques from a sheet of relatively rigid, transparent, thermoplastic material, such as cellulose acetate, cellulose acetate butyrate, cellulose propionate, rigid vinyl, polyethylene, polystyrene or styrene-acrylonitrile copolymers. After loading the article to be packaged within the cavity of the blister, the printed paperboard backing is placed over the mouth of the blister with the printed surface of the paperboard backing in contact with the flange portion of the blister. Sufficient heat and pressure are then applied to the mating surfaces so as to activate the adhesive printing ink and effect a heat-seal bond between the blister flange and the printed paperboard surface.

The heat-sealing operation in carried out on conventional heat-sealing machines of the standard jaw type design. These machines are generally provided with pre-built dies to conform to the shape of the blister flange so as to allow heat flow to be directed only to the sealing areas. The blister flange and the printed paperboard surface are held together under pressure between the sealing jaws and heat is applied thereto, either through the paperboard or through the blister flange. The factors involved, temperature, pressure, and dwell time, will vary according to the blister material, the thickness of the paperboard, and the method of sealing, i.e., whether the heat is applied through the board or through the blister. The heat-sealing conditions generally employed are temperatures ranging from about 150° to 400° F., pressures ranging from about 40 to 50 pounds per square inch, and dwell time ranging from about 1 to 10 seconds. Generally, applying the heat through the board requires higher temperatures and longer dwell time than applying heat through the blister. For example, 0.016 inch paperboard requires temperatures ranging from 350° F. to 400° F. for 3 to 4 seconds when applying the heat through the board, and temperatures ranging from 250° to 300° F. for 2 seconds when applying the heat through the blister.

The following are some specific examples of the carrying out of the invention. In these examples, the proportions are given as parts by weight. It is to be understood, of course, that the invention is not limited entirely to these specific examples.

Example I

To one surface of a 0.024 inch paperboard coated with an ink-receptive, heat-activatable adhesive coating composed of 100 parts of kaolin clay and 25 parts of a polyvinyl acetate having a molecular weight of 42,000, 7.5 parts "Santicizer 8," 0.25 part tributylphosphate (defoamer), and 0.2 part tetrasodium phosphate (dispersant) was applied, using a typographical press, a blue ink printing composition containing the following ingredients in the following parts by weight:

| Ingredient: | Parts by weight |
|---|---|
| Cyclohexanone-formaldehyde resin | 230 |
| Nitrocellulose (½ sec. RS) | 25 |
| "Santicizer 8" | 90 |
| Hexylene glycol | 280 |
| Triethylene glycol | 75 |
| Polyethylene wax | 70 |
| Cyanamid Milori Blue Pigment #50–1720 | 250 |

The cyclohexanone-formaldehyde polymer resin had a molecular weight (M.W) of 630.

The cyclohexanone-formaldehyde polymer resin is prepared by refluxing 500 parts of cyclohexanone and 625 parts formalin (37% solution of formaldehyde) in the presence of 20 parts sodium borate until a molecular weight range of 500 to 700 is reached.

The mixture is then acidified by the addition of a few drops of glacial acetic acid to the top water layer which is then decanted from the syrupy organic portion of the reaction mixture. The syrupy organic portion is then water-washed and dehydrated. The unreacted cyclohexanone is removed on a rotary evaporator. The product is a pale, hard resin with a softening range of 70° C. to 140° C.

The ink was dried at room temperature and yielded excellent prints.

The printed paperboard was then heat-sealed to a premolded cellulose acetate blister on a heat-sealing machine of the standard jaw type design. The board contained printed indicia in the heat-seal area. The resulting blister package, was found to possess an excellent heat-seal bond between the blister and the printed paperboard surface, even where the blister contacted the printed areas of the coated paperboard surface, as evidenced by the fact that when the blister was pulled off in the direction of the grain, the entire sealed area pulled the fiber off the paperboard.

In a control experiment, the above procedure was duplicated wherein the heat-seal areas of the blister package were printed with a printing ink wherein the resinous vehicle for the ink was either a modified maleic anhydride resin or coumarin-indene resin. The blister parted easily from the paperboard backing with no fiber failure occurring.

Example II

A kaolin clay-polyvinylacetate coated paperboard was printed following the procdeure of Example I with a black printing ink composition containing the following ingredients in the following parts by weight:

| Ingredient: | Parts of weight |
|---|---|
| Cyclohexanone-formaldehyde resin (M.W. 630) | 240 |
| Nitrocellulose (½ sec. RS) | 55 |
| "Santicizer 8" | 70 |
| Hexylene glycol | 180 |
| Dipropylene glycol | 60 |
| Triethylene glycol | 165 |
| Carbon black pigment | 180 |
| Polyethylene wax | 50 |

The paperboard surface was printed in the heat-seal area and then heat-sealed to a premolded, cellulose acetate butyrate blister in the manner described in Example I. The resultant blister package was tested for blister sealability as set forth in Example I. Removal of the blister resulted in the entire sealed area pulling the fiber of the paperboard, thus indicating an excellent heat-seal bond between the printed, coated paperboard surface and the blister.

Example III

A kaolin clay-polyvinylacetate coated paperboard was printed following the procedure of Example I with a yellow printing ink composition containing the following ingredients in the following parts by weight:

| Ingredient: | Parts by weight |
|---|---|
| Cyclohexanone - formaldehyde resin (M.W. 630) | 209 |
| Nitrocellulose (½ sec. RS) | 25 |
| Hexylene glycol | 76 |
| Dipropylene glycol | 95 |
| "Santicizer 8" | 90 |
| Chrome yellow pigment | 350 |
| Polyethylene wax | 60 |

The paperboard surface was printed in the heat-seal area and then heat-sealed to a premolded cellulose propionate blister in the manner described in Example I. The blister package sample was then tested for blister sealability in the same manner as described in Example I. The test indicated an excellent heat-seal bond between the printed paperboard surface and the blister.

What is claimed is:
1. The method of blister packaging an article in a container formed from a paperboard backing and a molded, transparent, thermoplastic blister having an outwardly extending integral flange portion around the entire periphery of its mouth, comprising the steps of:
 (a) applying to a surface of the paperborad backing a liquid coating composition consisting essentially of 100 parts by weight of a finely divided coating pigment containing kaolin clay in at least a predominant amount, and from 15 to 60 parts by weight on a solids basis of a vinyl acetate polymer resin;
 (b) drying the coating;
 (c) printing indicia on the coated paperboard surface with a printing ink composition comprised of a resinous vehicle and a coloring compound, the resinous vehicle consisting essentially of a cyclic ketone-formaldehyde resin;
 (d) positioning the article to be packaged within the cavity of the blister;
 (e) placing the paperboard backing over the mouth of the blister with the coated surface of the paperboard backing in contact with the flange portion of the blister; and
 (f) applying sufficient heat and pressure to the mating surfaces so as to effect a heat-seal bond therebetween.

2. The method of claim 1, wherein the cyclic ketone is cyclohexanone.

3. The method of claim 1 wherein the cyclic ketone-formaldehyde polymer resin is a cyclohexanone-formaldehyde resin having a molecular weight of about 500 to about 700.

4. The method of claim 1 wherein the resinous vehicle is dissolved in a solvent selected from the group consisting of aliphatic glycols and glycol ethers.

5. In a package of the blister type including an article disposed within the confines of a sealed container formed from a molded, transparent, thermoplastic blister having an outwardly extending integral flange portion around the entire periphery of its mouth and a printed indicia-bearing paperboard backing heat-sealed to the flange portion of the blister across the mouth thereof, the improvement wherein the surface of the paperboard backing which is heat-sealed to the blister, is provided with an ink-receptive, heat-activatable adhesive coating which is printed with a printing ink composition comprised of a resinous vehicle and a coloring compound, the resinous vehicle comprising a cyclic ketone-formaldehyde resin.

6. The package of claim 5 wherein the cyclic ketone-formaldehyde resin is a cyclohexanone-formaldehyde resin having a molecular weight of about 500 to about 700.

References Cited

UNITED STATES PATENTS 3,273,498   9/1966   Martin _____ 101—426
3,394,801   7/1968   Hanson _____ 206—78

WILLIAM T. DIXSON, Jr., Primary Examiner

U.S. Cl. X.R.

53—37; 106—26